(12) United States Patent
Lev et al.

(10) Patent No.: US 8,986,872 B2
(45) Date of Patent: Mar. 24, 2015

(54) BATTERY DESIGN

(75) Inventors: Leonid C. Lev, West Bloomfield, MI (US); Anne M. Dailly, West Bloomfield, MI (US); Nikolay Kondratyev, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 13/396,703

(22) Filed: Feb. 15, 2012

(65) Prior Publication Data

US 2013/0209847 A1  Aug. 15, 2013

(51) Int. Cl.
| | |
|---|---|
| *H01M 10/613* | (2014.01) |
| *H01M 10/04* | (2006.01) |
| *H01M 10/48* | (2006.01) |
| *H01M 10/6554* | (2014.01) |
| *H01M 2/20* | (2006.01) |
| *H01M 10/647* | (2014.01) |

(52) U.S. Cl.
CPC .......... *H01M 10/0472* (2013.01); *H01M 2/202* (2013.01); *H01M 10/0445* (2013.01); *H01M 10/486* (2013.01); *H01M 10/5032* (2013.01); *H01M 10/5053* (2013.01)
USPC .............................. 429/148; 429/90; 429/120

(58) Field of Classification Search
USPC ........................................... 429/90, 120, 148
See application file for complete search history.

(56) References Cited

U.S. PATENT DOCUMENTS

| | | | | |
|---|---|---|---|---|
| 2003/0027039 | A1* | 2/2003 | Benson et al. | 429/158 |
| 2005/0089750 | A1* | 4/2005 | Ng et al. | 429/120 |
| 2007/0020516 | A1* | 1/2007 | Yoon | 429/152 |
| 2010/0163325 | A1* | 7/2010 | Nakamura | 180/68.5 |
| 2010/0247999 | A1* | 9/2010 | Ijaz et al. | 429/120 |

FOREIGN PATENT DOCUMENTS

| | | |
|---|---|---|
| CN | 101194381 A | 6/2008 |
| CN | 101438454 A | 5/2009 |

OTHER PUBLICATIONS

The Penguin English Dictionary http://search.credoreference.com/content/entry/penguineng/helix/0.*
Collins English Dictionary http://search.credoreference.com/content/entry/hcengdict/core/0.*
Chambers 21st Century Dictionary http://search.credoreference.com/content/entry/chambdict/hollow/0.*

* cited by examiner

*Primary Examiner* — Stewart Fraser
*Assistant Examiner* — Olatunji Godo
(74) *Attorney, Agent, or Firm* — Fraser Clemens Martin & Miller LLC; William A. Ziehler

(57) ABSTRACT

A battery cell assembly includes a ganged plurality of battery cells. The battery cells are electrically connected in series. At least one hinge is disposed between an adjacent pair of the battery cells. The battery cells are configured to be stacked upon a folding of the battery cell assembly at the at least one hinge. A cooling plate assembly for use with the battery cell assembly, and a battery power system having the battery cell assembly interlaced with the cooling plate assembly, is also provided.

19 Claims, 14 Drawing Sheets

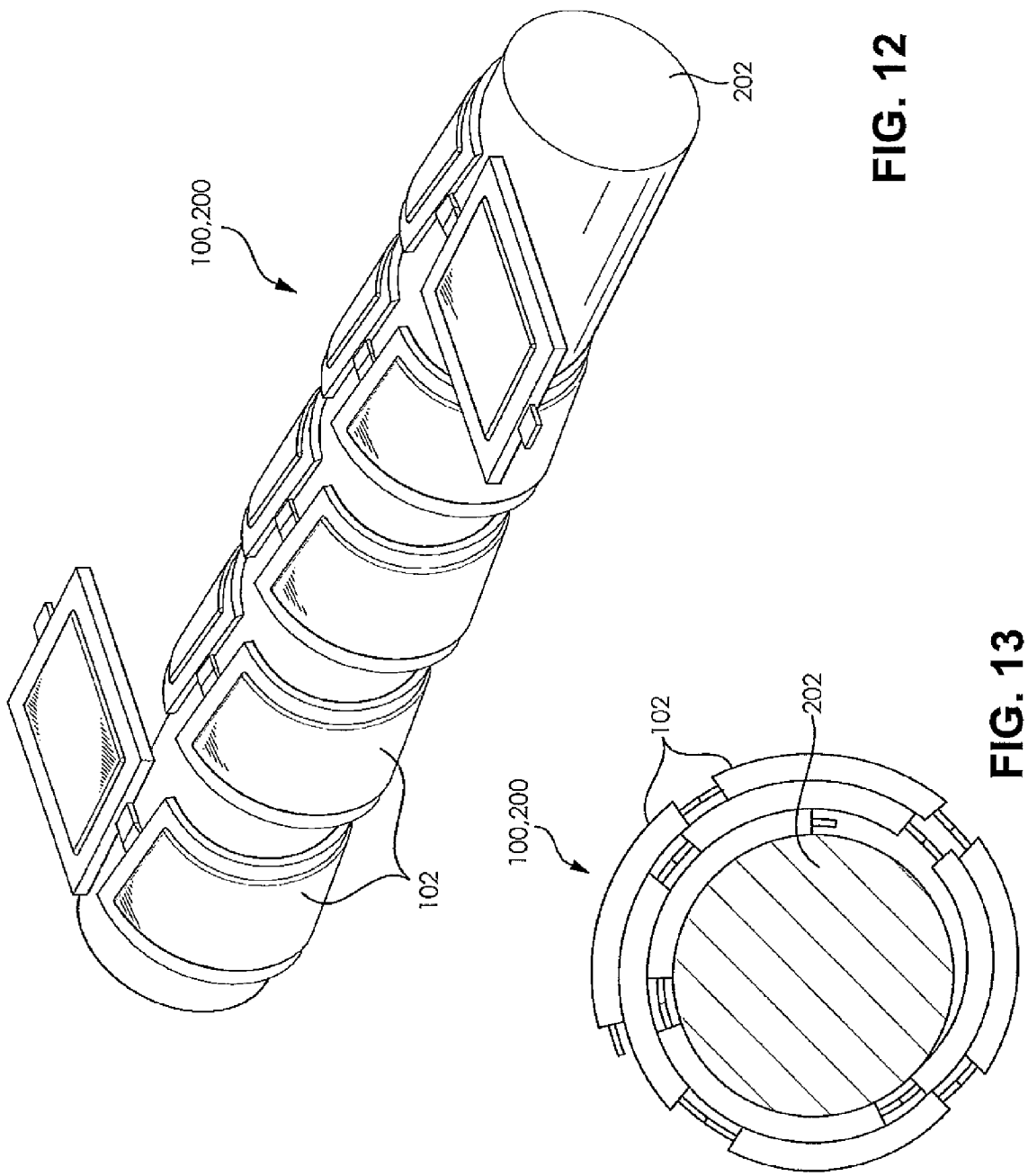

BATTERY DESIGN

FIELD OF THE INVENTION

The present disclosure relates to a battery cell and more particularly to an assembly of battery cells for a battery power system.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles.

A plurality of the battery cells can be provided in a battery cell pack or module to provide an amount of power sufficient to operate electric vehicles. Known battery cells such as lithium-ion battery cells have generally been provided as individual battery cells. The individual battery cells are typically arranged in a stack, and have electrical tabs that are connected to an electrical systems such as an interconnect board for provision of electrical power to a load, and for charging and discharging of the battery cells.

Cooling systems are typically employed with battery cells to militate against undesirable overheating conditions. Conventional cooling systems have included cooling plates disposed between individual battery cells within the stack. The cooling plates have had channels through which cooling fluid or air is circulated in order to regulate the temperature of the battery cells in operation. The assembling of battery cells together with electrical systems and cooling systems in a battery power system is known to be a time consuming and laborious manufacturing process.

There is a continuing need for a battery cell assembly that has a minimized number of parts, and which provides a simplified method of manufacture for a battery power system.

SUMMARY OF THE INVENTION

In concordance with the instant disclosure, a battery cell assembly that has a minimized number of parts, and which provides a simplified method of manufacture for a battery power system, is surprisingly discovered.

In a first embodiment, a battery cell assembly includes a ganged plurality of battery cells. The battery cells are electrically connected in series. At least one hinge is disposed between an adjacent pair of the battery cells. The battery cells are configured to be stacked upon a folding of the battery cell assembly at the at least one hinge.

In another embodiment, a cooling plate assembly for use with the battery cell assembly includes a ganged plurality of cooling plates. The ganged plurality of cooling plates includes at least one hinge disposed between an adjacent pair of the cooling plates. The cooling plates are configured to be stacked upon a folding of the cooling plate assembly at the at least one hinge.

In a further embodiment, a battery power system includes a battery cell assembly and a cooling plate assembly. The battery cells and the cooling plates are alternated in a stack upon a folding together of each of the battery cell assembly and the cooling plate assembly at the respective at least one hinges.

DRAWINGS

The above, as well as other advantages of the present disclosure, will become readily apparent to those skilled in the art from the following detailed description, particularly when considered in the light of the drawings described herein.

FIG. 12 is a fragmentary side perspective view of a ganged battery cell assembly according to an additional embodiment of the disclosure, having the ganged battery cell assembly helically wound onto a core; and FIG. 13 is a side elevational view of a ganged battery cell assembly according to a further embodiment of the disclosure, having the ganged battery cell assembly spirally would onto a core.

DETAILED DESCRIPTION OF THE INVENTION

The following detailed description and appended drawings describe and illustrate various embodiments of the invention.

The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1:
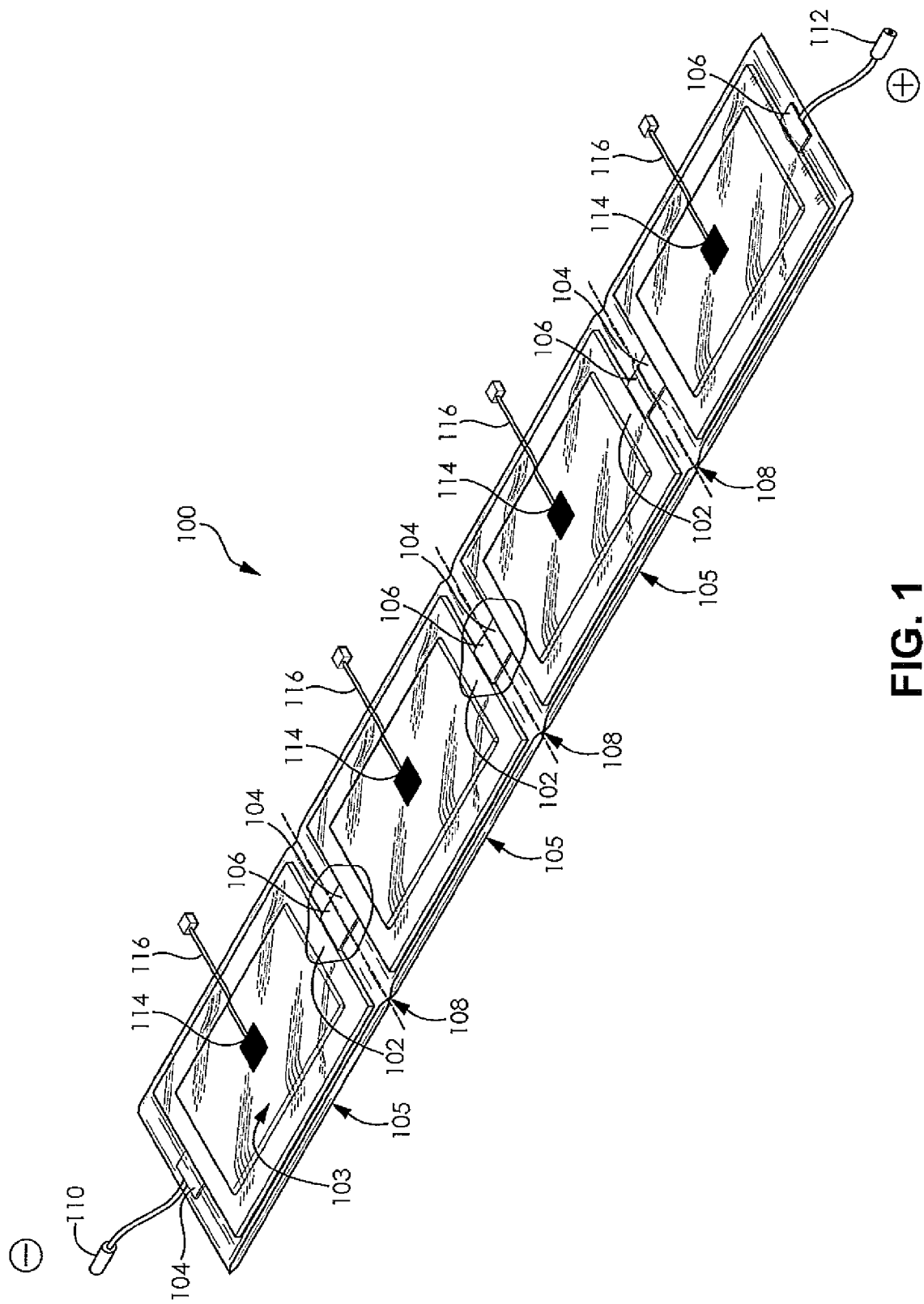
FIG. 1 is a side perspective view of a ganged battery cell assembly according to one embodiment of the present disclosure, with portions of outer nonconductive layers removed for purpose of illustrating the underlying arrangement of the battery cells.

With reference to FIG. 1, a battery cell assembly 100 according to one embodiment of the present disclosure is shown. The battery cell assembly 100 includes a plurality of battery cells 102. The battery cells 102 shown are prismatic battery cells. As a nonlimiting example, the battery cells 102 may be a prismatic lithium-ion (Li-ion) pouch cell. It should be appreciated that other types of battery cells 102, employing a different structure and a different electrochemistry, may also be used within the scope of the present invention. Although only four battery cells 102 are shown in FIG. 1, it should also be understood that any number of the battery cells 102 may be employed to form the battery cell assembly 100 of the present disclosure.

The battery cells 102 of the battery cell assembly 100 are ganged or otherwise physically linked in series. Being ganged, the battery cells 102 advantageously may be provided on a roll, drum or spool, and folded accordion-like into a frame during manufacture of a battery power system having the battery cell assembly 100. The battery cells 102 have a first terminal 104 and a second terminal 106. The first terminal 104 may be positive and the second terminal 106 may be negative, or vice-versa, as desired.

As shown in FIG. 1, the first terminal 104 and the second terminal 106 may be tabs that extend outwardly from opposing sides of each of the battery cells 102. Other locations and types of the first and second terminals 104, 106 may also be used. Additionally, the first and second terminals 104, 106 may be formed from the same or a different material. Where different materials are employed, the first and second terminals 104, 106 form a composite tab when connected. In a particular embodiment, the first terminal 104 is formed from a nickel-coated copper, and the second terminal 106 is formed from an anodized aluminum. Other suitable electrically conductive materials for the first and second terminals 104, 106 may also be used within the scope of the present disclosure.

Figure 7:
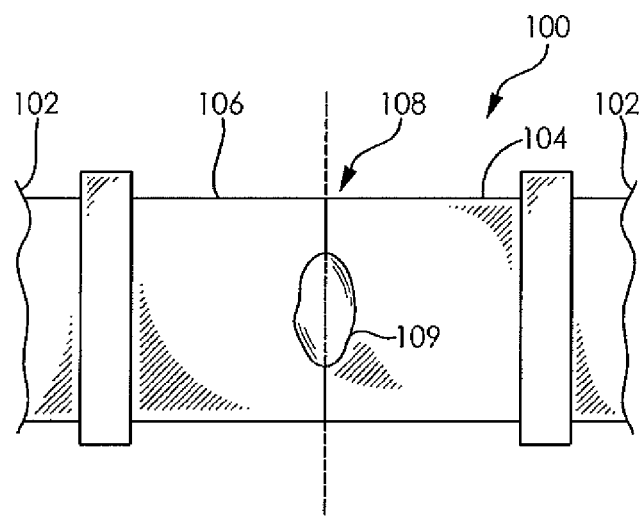
FIG. 7 is an enlarged fragmentary top plan view of electrical terminals for the ganged battery cells depicted in FIG. 1, further showing a welding together of the electrical terminals to join the battery cells in electrical series.

In addition to being ganged, the battery cells 102 may also be electrically connected in series. For example, the first terminal 104 and the second terminal 106 of an adjacent pair of the battery cells may be directly coupled by means of a weld 109 (shown in FIG. 7), solder, mechanical connector, or electrically conductive adhesive. Nonlimiting examples of suitable welds 109 may include laser welds, ion-beam welds, resistance welds, friction welds, or the like. Suitable mechanical connectors may include clips, rivets, clamps, or the like. A skilled artisan may select a suitable type of electrically conductive adhesive for the battery application. Other means for electrically connected the battery cells 102 may also be employed within the scope of the present disclosure.

Figure 9:
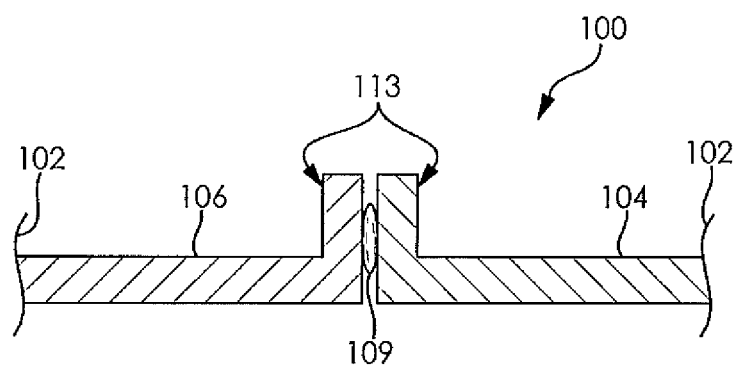
FIG. 9 is a fragmentary side cross-sectional elevational view of a pair of electrical terminals for ganged battery cells according to another embodiment of the disclosure, further showing feet at ends of the electrical terminals that are welded together to join the battery cells in electrical series.
Figure 10:
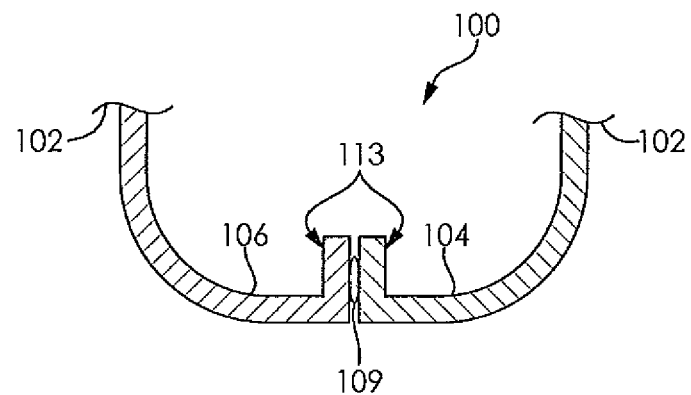
FIG. 10, is a fragmentary side cross-sectional elevational view of the pair of electrical terminals depicted in FIG. 9, the electrical terminals having been bent or flexed during a folding and stacking operation of the ganged battery cells.
Figure 11:
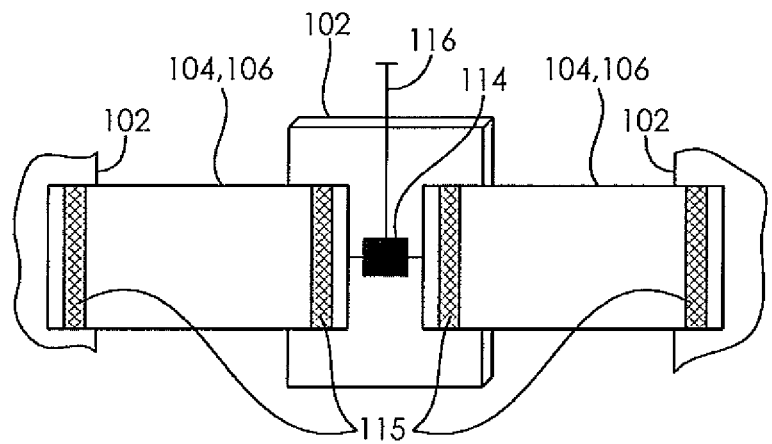
FIG. 11 is an enlarged fragmentary side perspective view of a battery cell assembly according to a further embodiment of the disclosure, having a single, unitary electrical connector disposed between and connecting in electrical series adjacent battery cells of the battery cell assembly.

In a particular embodiment illustrated in FIGS. 9-10, each of the first and second terminals 104, 106 may have a foot 113 that facilitates the coupling of the first terminal 104 with the second terminal 106. The foot 113 may be substantially L-shaped in cross-section, for example. Alternatively, as shown in FIG. 11, the adjacent battery cells 102 may be linked in electrical series by a single, unitary strip 104, 106. The single, unitary strip 104, 106 may be connected by welds 115 to the respective battery cells 102.

With renewed reference to FIG. 1, the ganged battery cells 102 have at least one hinge 108 disposed between the adjacent pair of the battery cells 102. For example, the at least one hinge 108 is a flexible connector disposed between the battery cells 102. The at least one hinge 108 may also be pre-stamped to form a plastic or living hinge that is biased to bend in a desired direction. Along a length of the battery cell assembly 100, where multiple hinges 108 are employed, the hinges 108 may be pre-stamped in an alternating fashion in order to facilitate an accordion-like folding the battery cell assembly 100.

Figure 3:
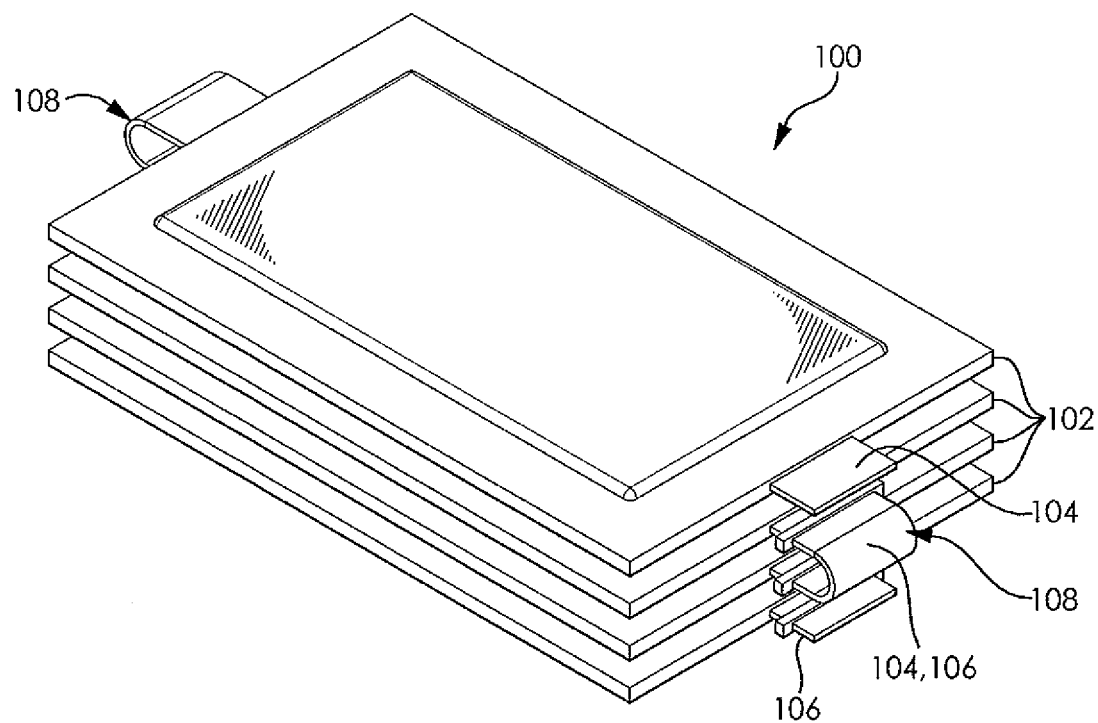
FIG. 3 is a side perspective view of the ganged battery cell assembly depicted in FIG. 1, the ganged battery cell assembly folded accordion-style and having the outer nonconductive layers removed for purpose of illustrating the folding of the ganged battery cell assembly into a stack.

In certain embodiments, at least one of the first terminal 104 and the second terminal 106 of the battery cells is also disposed in the hinge 108. Thus, at least one of the first terminal 104 and the second terminal 106 is configured to be bent or flexed when the battery cells 102 are folded together at the at least one hinge 108. The at least one hinge 108 permits the adjacent pair of the battery cells 102 to fold toward one another and to be stacked upon a folding of the battery cell assembly 100. As a nonlimiting example, the battery cell assembly 100 may be folded at the dashed lines shown in FIG. 1.

Where there are more than two battery cells 102 in the battery cell assembly 100, the battery cell assembly 100 likewise has a plurality of hinges 108 that flexibly connect the more than two battery cells 102. It should be understood that the flexible hinges 108 thereby permit the battery cells 102 to be folded into a Z-style or accordion-style stack, for example, as shown in FIG. 3.

In the illustrative embodiment shown in FIG. 1, the ganged battery cells 102 are disposed between a first nonconductive layer 103 and a second nonconductive layer 105, which together form the at least one hinge 108. The first and second nonconductive layers 103, 105 may be provided as separate layers, between which the ganged battery cells 102 are laminated and sealed. For example, the first and second nonconductive layers 103, 105 may be pouch sheathing material used for manufacturing the individual battery cells 102. The battery cells 102 are packaged and sealed in series between the first and second nonconductive layers 103, 105, as opposed to being packaged, sealed, and separated between the first and second nonconductive layers 103, 105 to provide independent battery cells 102. In other embodiments, the first and second nonconductive layers 103, 105 are provided as an integral elongate tube or bag in which the ganged battery cells 102 are disposed.

The first nonconductive layer 103 and the second nonconductive layer 105 together encapsulate the ganged battery cells 102. The first nonconductive layer 103 and the second nonconductive layer 105 may also electrically insulate an entirety of each of the battery cells 102, including the first and second terminals 104, 106. Thus, the battery cell assembly 100 may be sealed from moisture and condensation, enhancing the corrosion resistance of the battery cell assembly 100 having the ganged plurality of battery cells 102.

In particular embodiments, the first and second nonconductive layers 103, 105 form the flexible hinges 108 between the battery cells 102. As a nonlimiting example, the first and second nonconductive layers 103, 105 may be formed from a flexible, insulating thermoplastic material, which permits the folding of the battery cell assembly 100 at locations between pairs of the ganged battery cells 102. Other electrically insulating materials may also be employed for the first and second nonconductive layers 103, 105, as desired.

In other embodiments, the at least one hinge 108 may be provided by a strip of nonconductive material (not shown), such as a thermoplastic or fabric material, attached to adjacent battery cells 102 within the ganged battery cell assembly 100. The strip of nonconductive material may be attached by welding, mechanical connectors, or adhesives, as nonlimiting examples. A skilled artisan may also select other suitable means for connecting the at least one hinge 108 to each of the adjacent battery cells 102.

It should also be understood that one of ordinary skill in the art may provide alternate means for ganging together the battery cells 102, such as wires, hooks, springs, or the like. These alternate means for ganging together the battery cells 102 are likewise within the scope of the present disclosure.

As also shown in FIG. 1, the battery cell assembly 100 may have a pair of leads 110, 112 which are connected to one of the first and second terminals 104, 106 at opposing ends of the battery cell assembly 100. The leads 110, 112 extend outwardly from the sealed first and second nonconductive layers 103, 105. Each of the leads 110, 112 may also includes fuses. The leads 110,112 are configured to electrically connect the battery cell assembly 100 to an interconnect board (not shown) or other means for delivering power to a load such as an electric motor.

Figure 2:
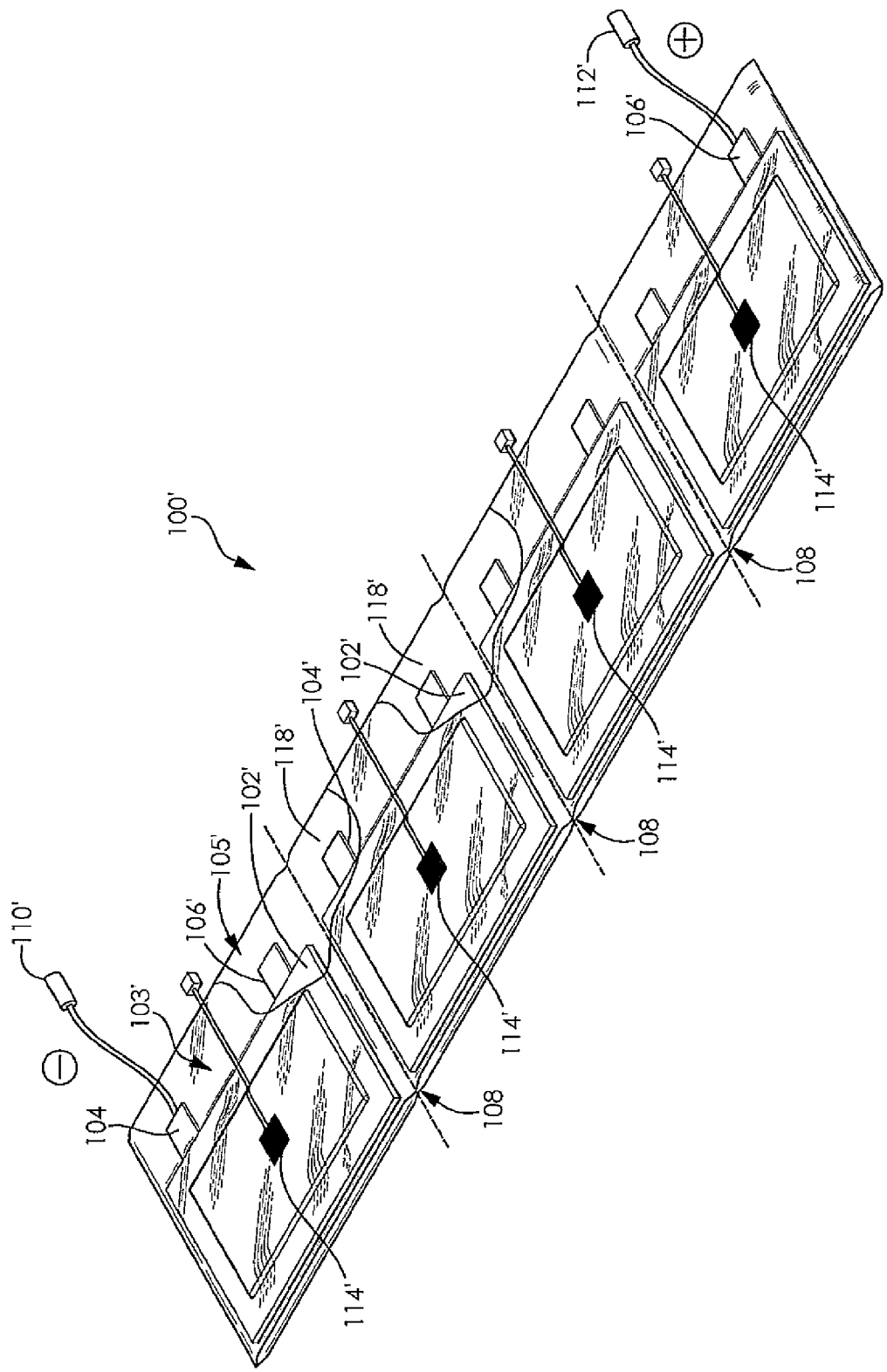
FIG. 2 is a side perspective view of a ganged battery cell assembly according to another embodiment of the present disclosure, with portions of outer nonconductive layers removed for purpose of illustrating the underlying arrangement of the battery cells.

The battery cell assembly 100 may also have a battery management system sensor 114. The sensor 114 is disposed on at least one of the battery cells 102. The sensor 114 is configured to detect at least one of a temperature and a voltage of the battery cell 102 on which the battery management system sensor 114 is disposed. As shown in FIGS. 1 and 2, the sensor 114 may be centrally disposed on a body each of the battery cells 102 for the purpose of measuring the temperatures thereof. As further shown in FIG. 11, the sensor 114 may be disposed between the first and second terminals 104, 106 on each of the battery cells 102 for measurement of voltage for each of the individual battery cells 102.

The sensor 114 may also be affixed to the battery cell 102, for example, by welding, adhesive, or mechanical connector. Suitable welding techniques may include ultrasonic welding, although other types of welding may also be used.

In particular embodiments, the battery cell assembly 100 includes a multitude of sensors 114, so that the operation of individual ones of the battery cells 102 in the battery cell assembly 100 may be monitored during operation of the battery power system. The sensors 114 may be connected to a computer-based monitoring system (not shown) by leads 116, for example, extending outwardly from the sealed first and second nonconductive layers 103, 105. In other examples, the sensors 114 are equipped with a wireless transmitter, and may communicate information about the status of the battery cells 102 wirelessly to the monitoring system. Other types of sensors and communication arrays may also be employed, as desired.

In other embodiments, where the battery cell assembly 100 includes at least two hinges 108 disposed between three adjacent battery cells 102, the battery cells 102 may be situated in a two-dimensional array (not shown). In such a configuration, the battery cell assembly 100 is configured to be stacked laterally, for example, to stack up adjacent rows of the ganged battery cells 102 in the array, and then stacked axially, accordion-style, upon a folding of the battery cell assembly at the at least two hinges 108. The hinges 108 in the different rows of the array may be of different lengths and flexibility in order to accommodate the axial accordion-style stacking of the different rows after they have also been stacked laterally. A skilled artisan may select any numbers of rows for the array of the battery cell assembly 100, within the scope of the disclosure.

Figure 8:
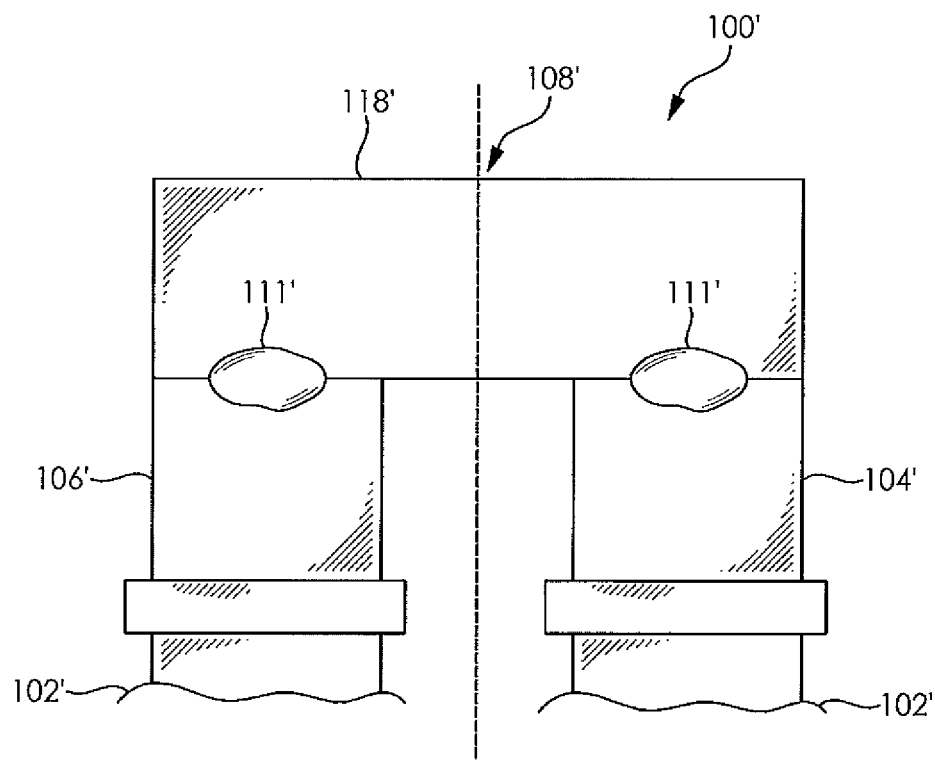
FIG. 8 is an enlarged fragmentary top plan view of electrical terminals for the ganged battery cells depicted in FIG. 2, further showing a welding together of the electrical terminals with a jumper to join the battery cells in electrical series.

With reference to FIGS. 2 and 8, a battery cell assembly 100' according to another embodiment of the disclosure is illustrated. Like or related structure from FIG. 1 is depicted in FIGS. 2 and 8 with a same reference number and the addition of a prime (') symbol, for the purpose of clarity.

The battery cell assembly 100' includes a ganged plurality of battery cells 102' that are connected in series by jumpers 118'. The jumpers 118' are particularly used when the first terminal 104' and the second terminal 106' extend outwardly from a same side of the battery cell 102', as shown in FIGS. 2 and 8. The jumpers 118' are electrically conductive connectors that extend between the first terminal 104' and the second terminal 106' of the adjacent pair of the battery cells 102'.

In a particular embodiment shown in FIG. 8, the jumpers 118' are metal strips that are coupled with each of the first terminal 104' and the second terminal 106' with welds 111'. Advantageously, the jumpers 118' are flexible and permit the folding of the battery cell assembly 100' at the at least one hinge 108', so that the battery cells 102' may be stacked accordion-style in the battery power system.

Figure 4:
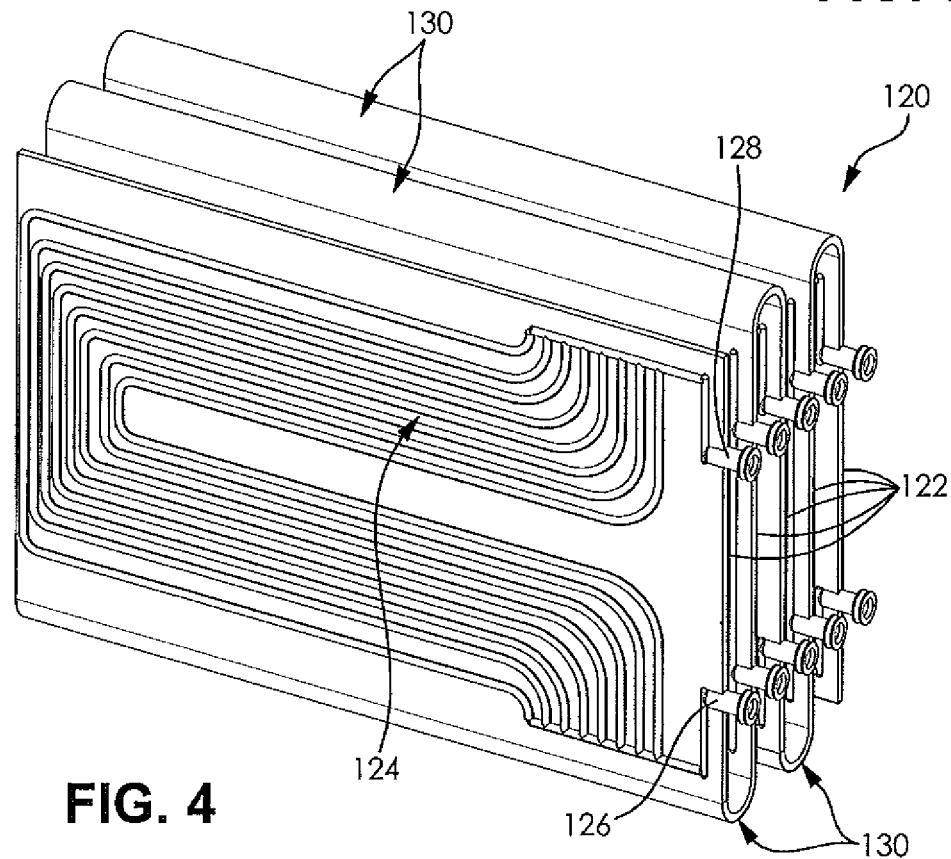
FIG. 4 is a side perspective view of a ganged cooling plate assembly for use with the ganged battery cell assembly depicted in FIGS. 1 and 3, the ganged cooling plate assembly folded accordion-style.
Figure 5A:
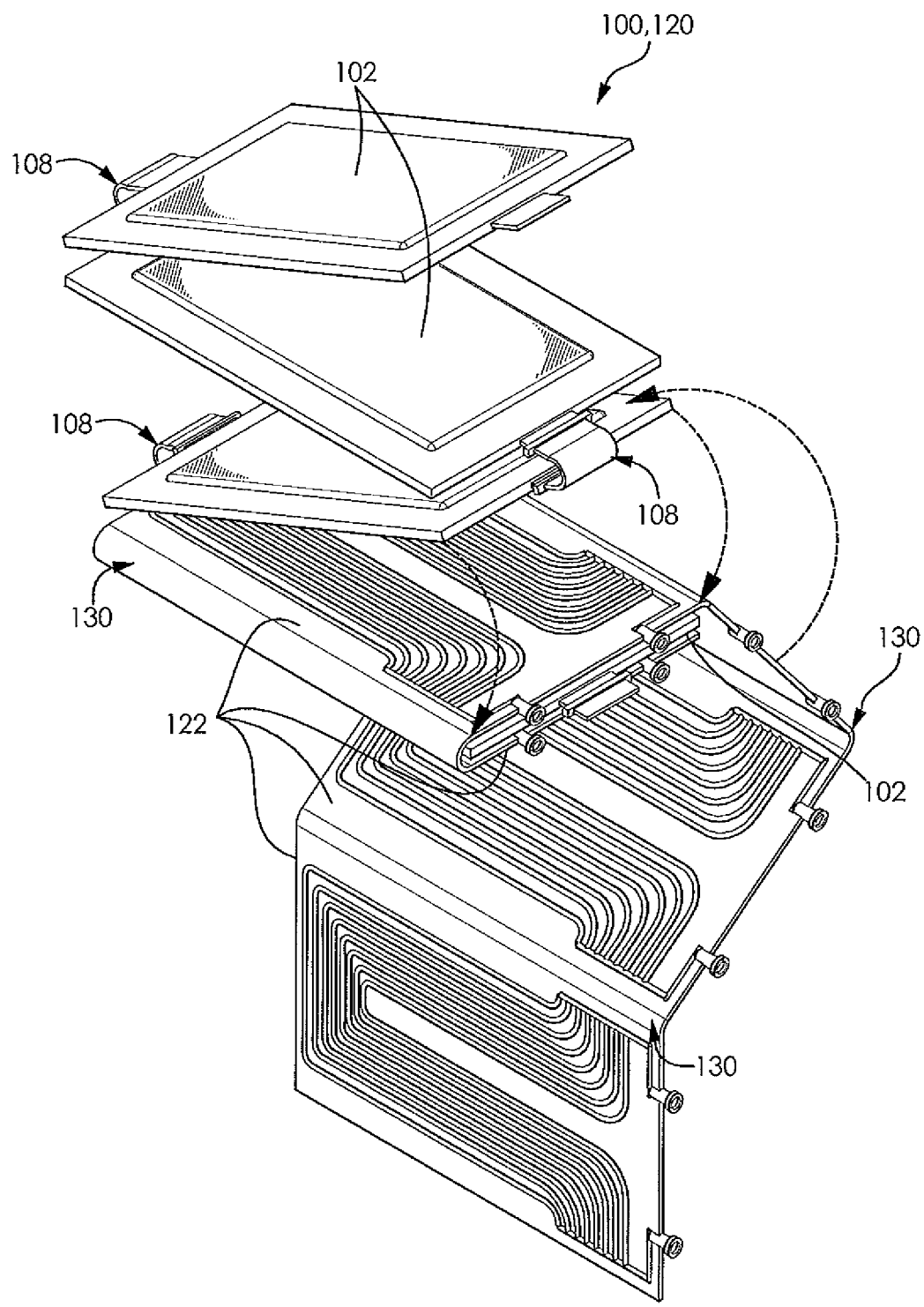
FIGS. 5A-5D are side perspective views of the ganged battery cell assembly of FIGS. 1 and 3, shown cooperating with the ganged cooling plate assembly of FIG. 4, and with arrows identifying the stepwise folding together of the ganged battery cells with the ganged cooling plates to form a stack.
Figure 5B:
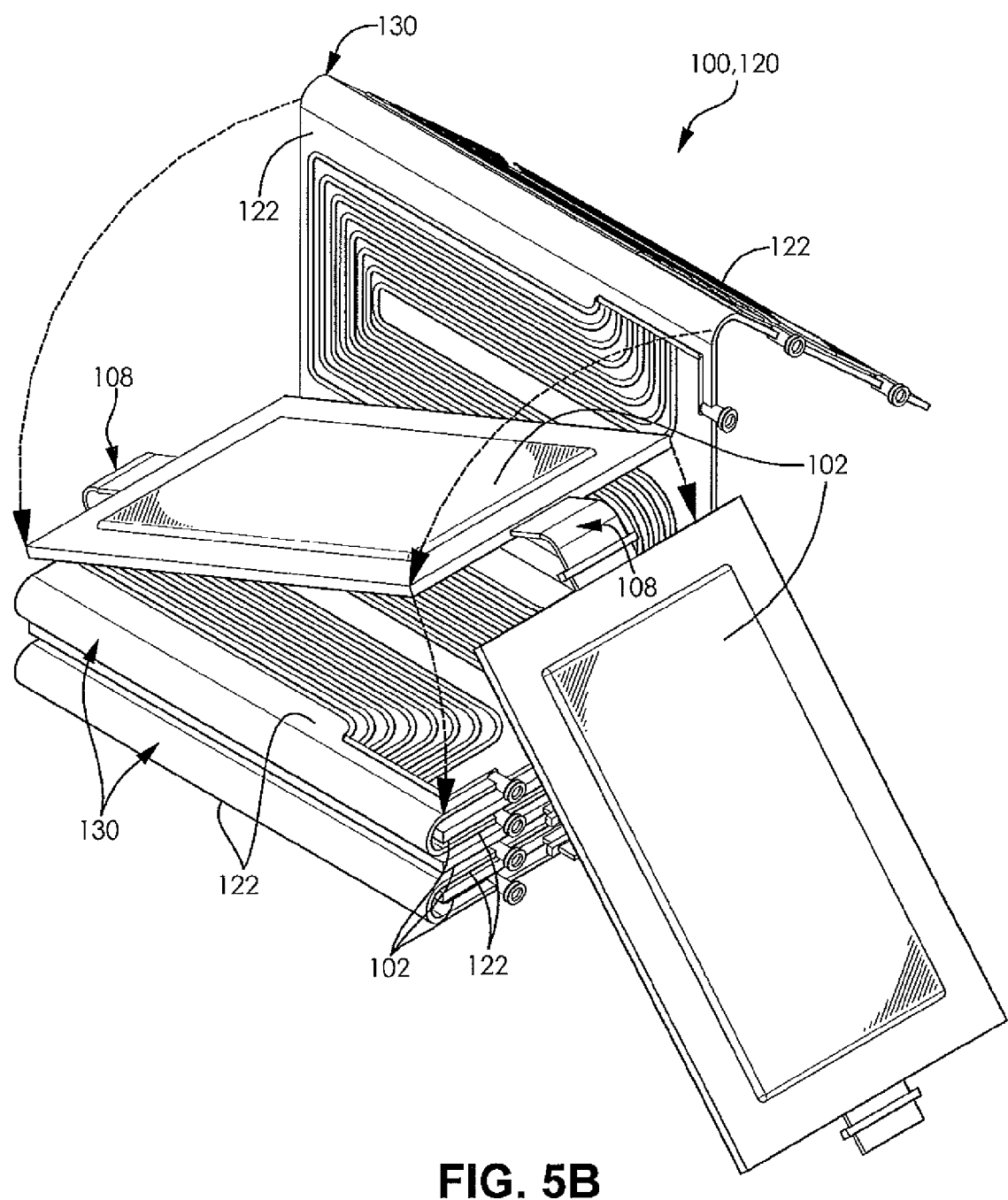
Figure 5C:
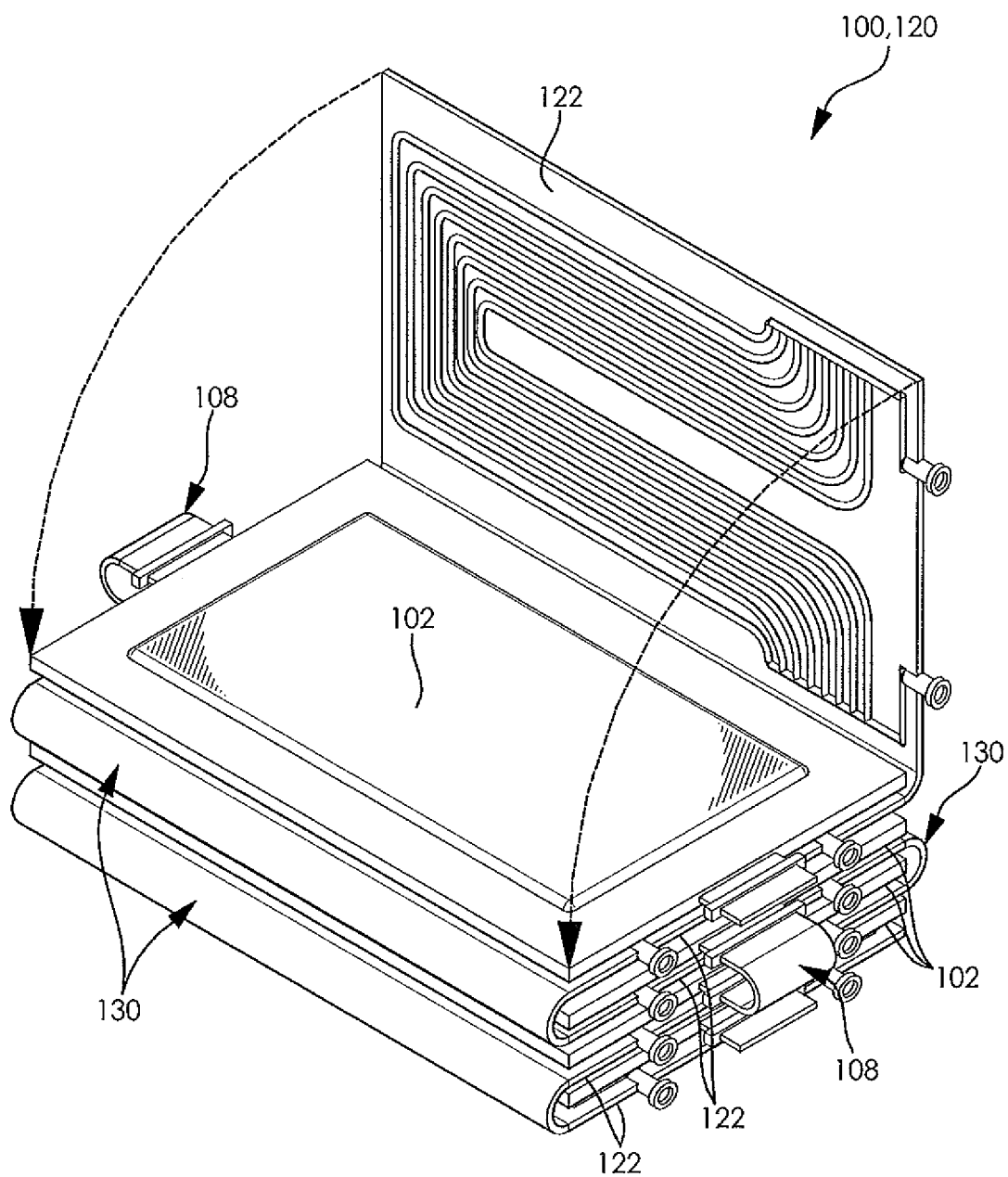
Figure 5D:
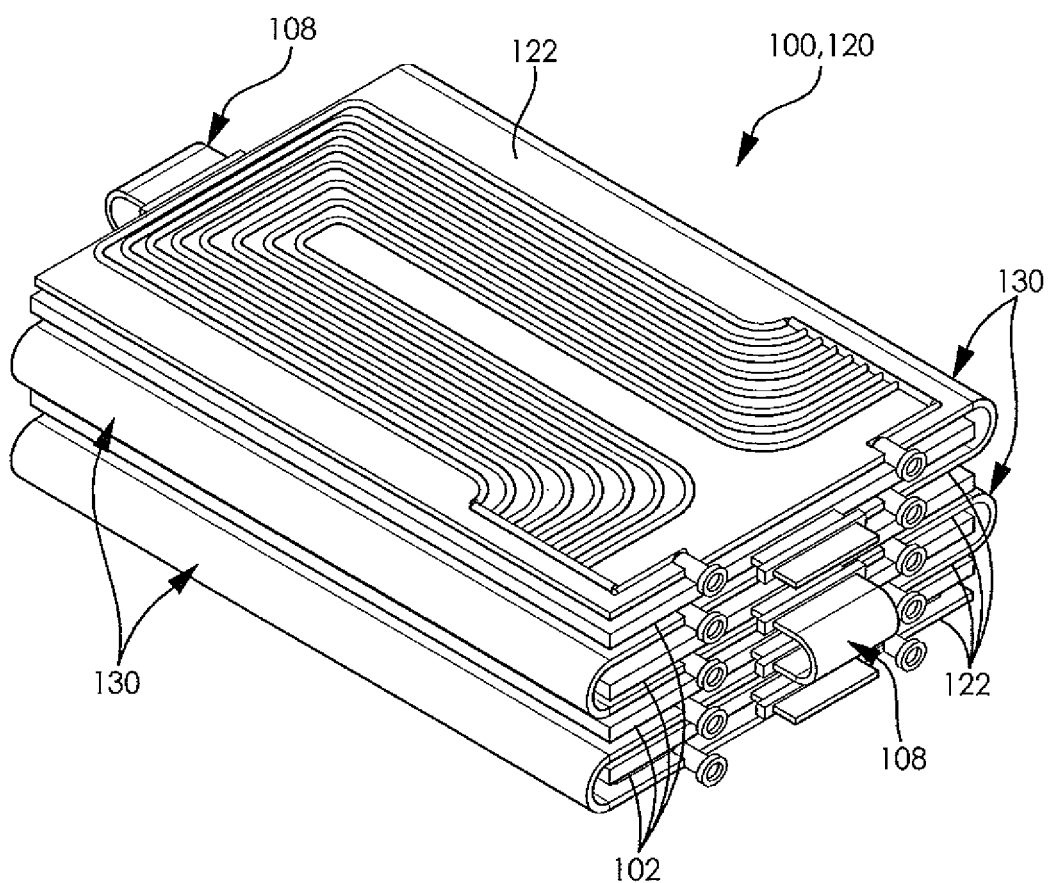
Figure 6A:
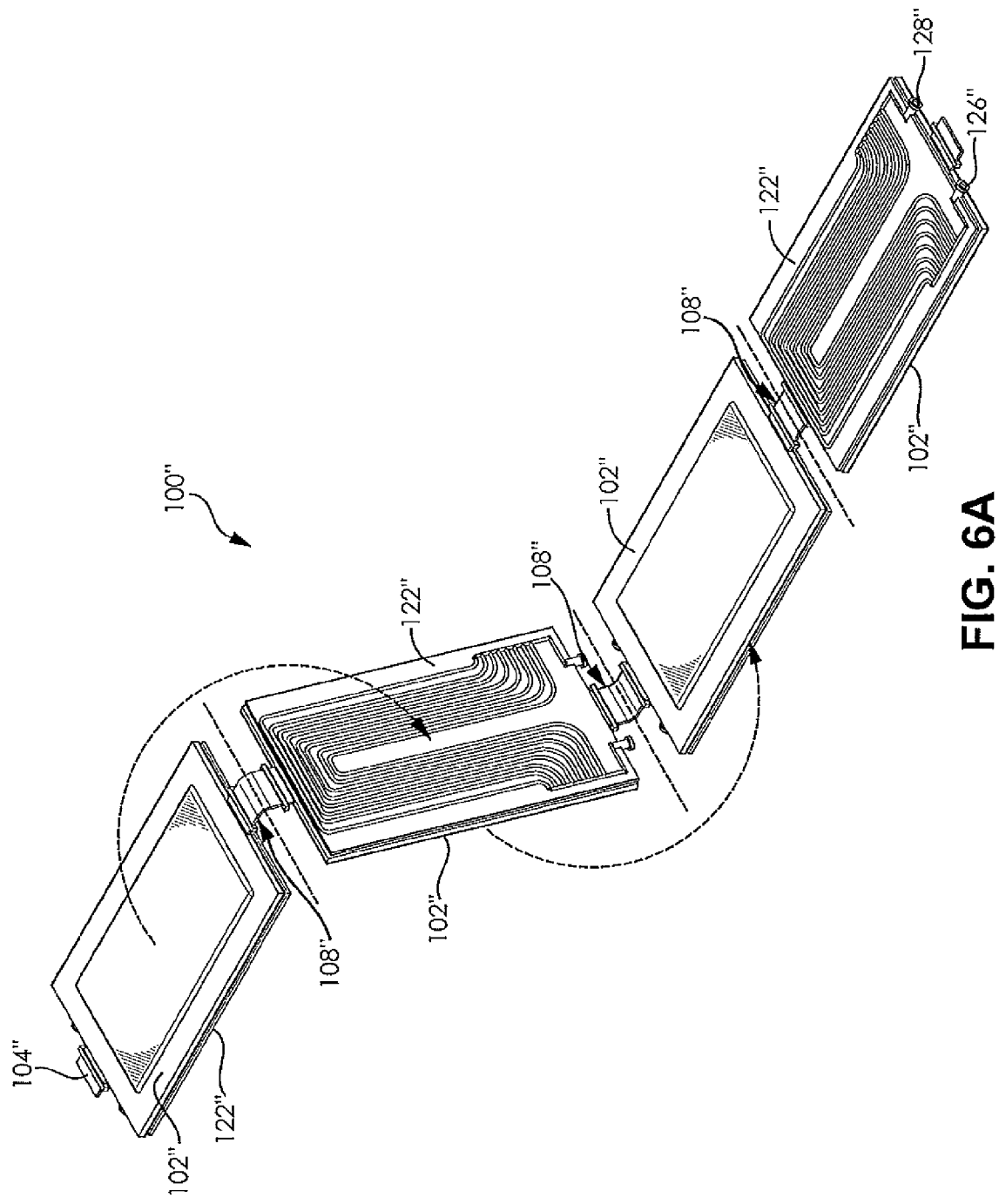
FIGS. 6A-6D are side perspective views of a ganged battery cell assembly according to a further embodiment of the present disclosure, having a cooling plate integrated with each of the ganged battery cells, with arrows identifying the stepwise folding together of the ganged battery cells and integral cooling plates to form a stack.
Figure 6B:
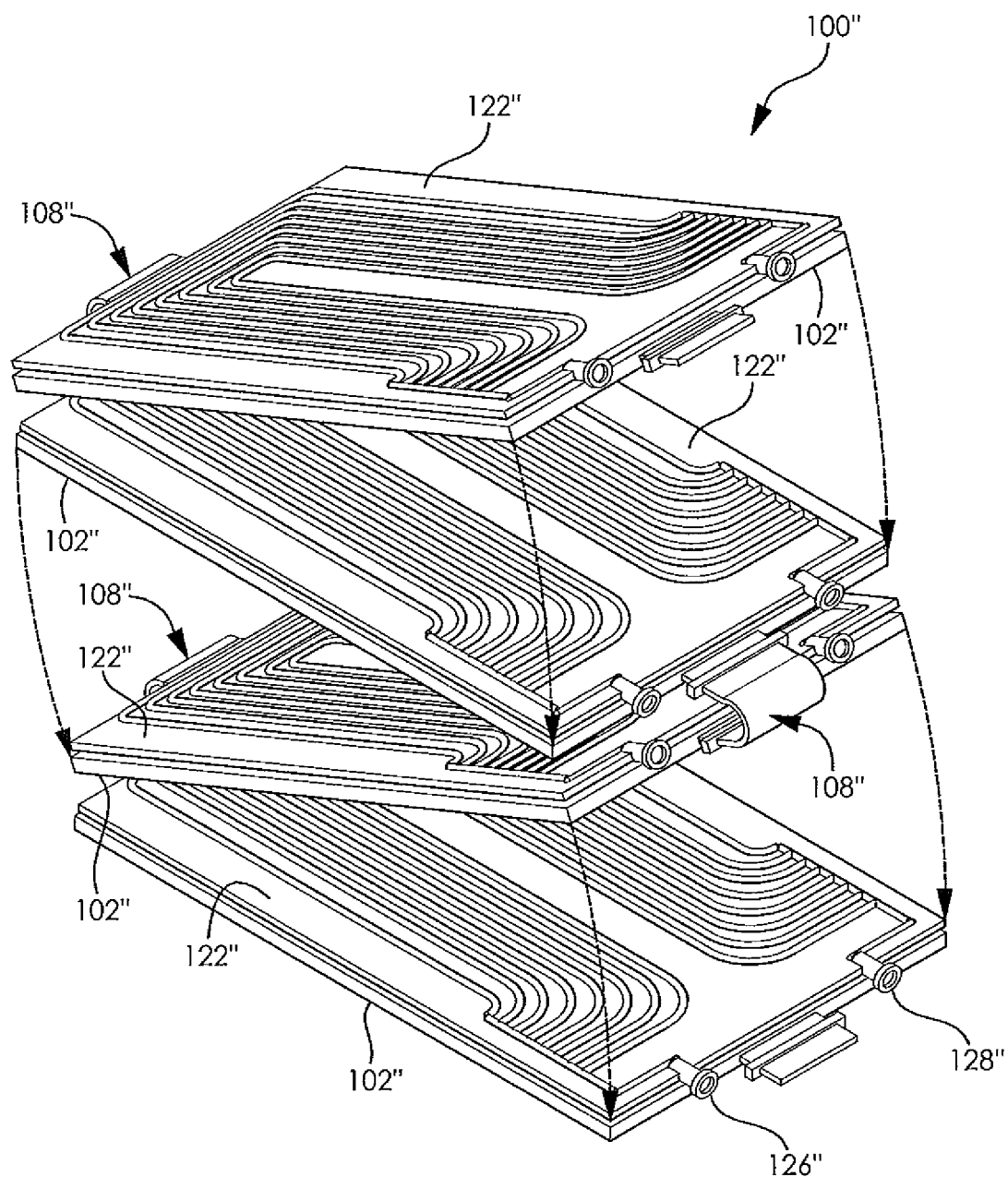
Figure 6C:
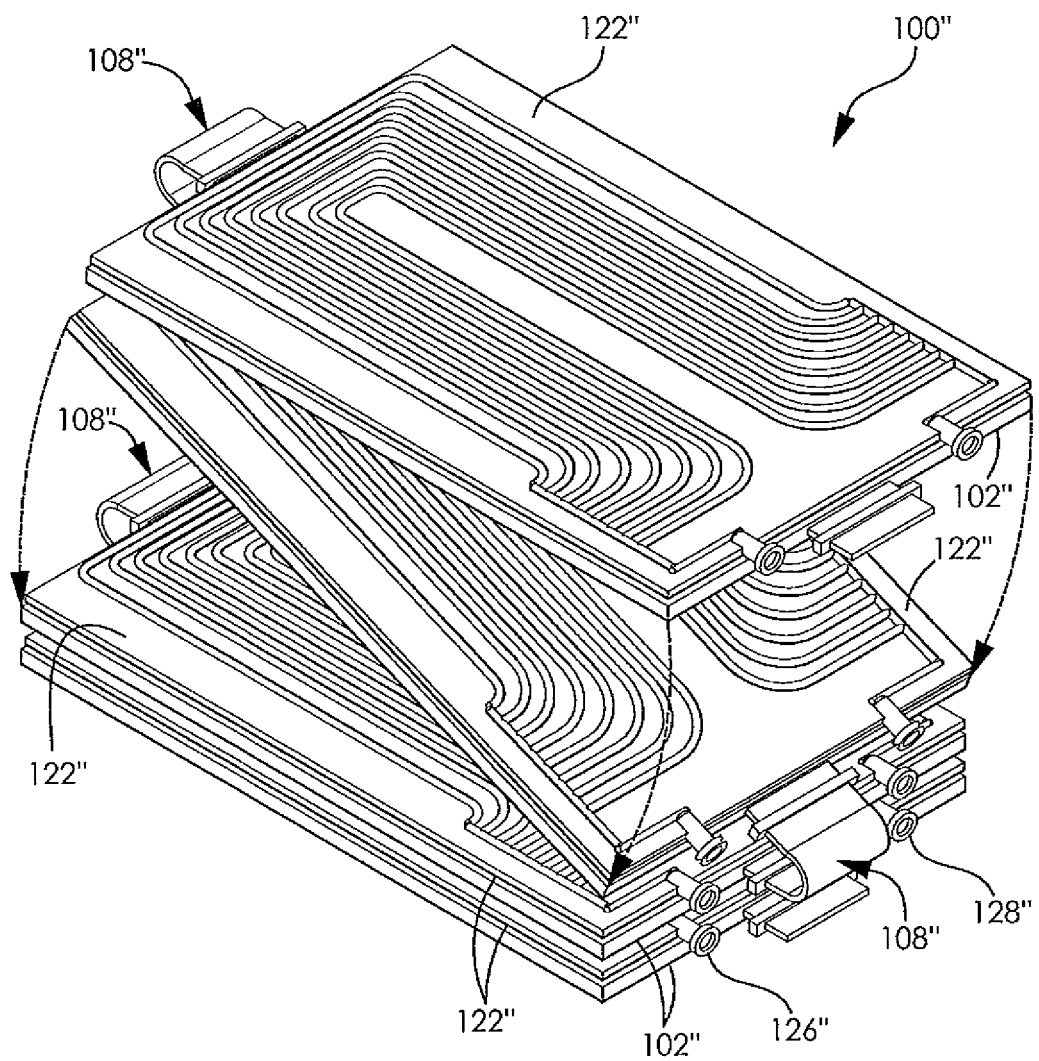
Figure 6D:
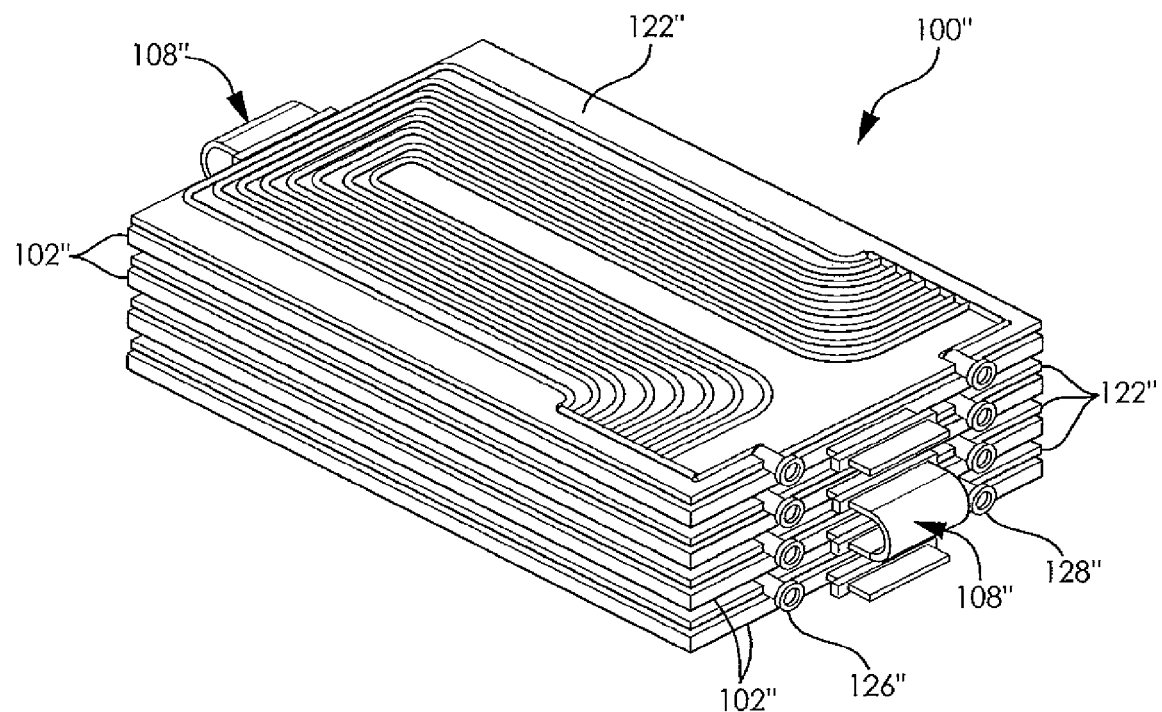

Referring now to FIG. 4, the present disclosure further includes a cooling plate assembly 120. The cooling plate assembly 120 is used with the battery cell assembly 100, 100' to form the battery power system. The cooling plate assembly 120 includes a ganged plurality of cooling plates 122. In exemplary embodiments, each of the cooling plates 122 has a coolant flow field 124 with a plurality of channels for circulation of a cooling fluid therethrough. The cooling plates 122 each also have a coolant inlet 126 and a coolant outlet 128 for placing the cooling plate 122 in communication with a coolant system (not shown). In other embodiments, the cooling plates 122 do not have the coolant flow field 124, and are instead placed in thermal communication with both the battery cells 102 and a heat sink (now shown) for purposes of regulating the temperature of the battery cells 102. One of ordinary skill in the art may employ different types of cooling plates 122, having different structures and means for regulating temperature, as desired.

Like the battery cells 102, 102', the cooling plate assembly 120 has at least one hinge 130 disposed between an adjacent pair of the cooling plates 122. The at least one hinge 130 may be disposed between the coolant flow fields 124 of the adjacent pair of the cooling plates 122. Illustratively, the at least one hinge 130 of the cooling plate assembly 120 may be a region of flexible, thin sheet metal disposed between the coolant flow fields 124. The flexible, thin sheet metal of the hinge 130 may undergo plastic deformation when the cooling plates 122 are folded at the hinge 130. The plurality of cooling plates 122 is configured to be stacked upon a folding of the cooling plate assembly 120 at the at least one hinge 130, for example, as shown in FIG. 4.

With reference to FIGS. 5A-5D, a stepwise folding of the battery cell assembly 100 and the cooling plate assembly 120 into the battery power system of the present disclosure is shown. The battery cell assembly 100 is also shown without the first and second nonconductive layers 103, 105 that encapsulate the battery cells 102, for the purpose illustrating how the battery power system is folded together and assembled.

In particular, each of the battery cells 102 and the cooling plates 122 is alternated in a stack, accordion-style, upon a folding together of each of the battery cell assembly 100 and the cooling plate assembly 120 at the respective hinges 108, 130. The at least one hinge 108 of the battery cell assembly 100 may also be oriented substantially orthogonal to the at least one hinge 130 of the cooling plate assembly. Thus, the ganged battery cells 102 and the ganged cooling plates 122 may be interlaced and folded together at about a 90° angle relative to one another. The battery power system according to one embodiment of the disclosure is thereby manufactured.

Referring now to FIGS. 6A-6D, the battery power system and method for manufacture thereof, according to another embodiment of the present disclosure, is shown. Like or related structure from FIGS. 1-5D is depicted in FIGS. 6A-6D with a same reference number and the addition of a double-prime (") symbol, for the purpose of clarity.

The battery cell assembly 100" shown in FIGS. 6A-6D includes the ganged plurality of battery cells 102". The battery cell assembly 100" is shown without the first and second nonconductive layers 103, 105 that encapsulate the battery cells 102", for the purpose illustrating how the battery power system is folded together and assembled. At least one of the adjacent pair of battery cells 102" has the cooling plate 122" integrally formed therewith. For example, the cooling plate 122" may be attached to the battery cell 102" with a high thermal conductivity adhesive. The cooling plate 122" is configured to be disposed between the adjacent pair of the battery cells 102" upon the folding of the battery cell assembly 100" at the at least one hinge 108". In particular, the battery cell assembly 100" with the integrated cooling plate 122" may be folded accordion-style to form the stack for the battery power system. The battery power system according to a further embodiment of the disclosure is thereby manufactured.

Referring now to FIGS. 12 and 13, a battery cell assembly 200 according to other embodiments may include the battery cells 102 wound upon a core 202. The core 202 is electrically nonconductive, and in particular may be formed from an electrically nonconductive thermoplastic material. The core 202 may be cylindrical or angular in shape. Any desired materials and shapes may be used for the core 202. The battery cell assembly 200 may include the ganged battery cells 102 wound helically along a length of the core 202, for example, as shown in FIG. 12, or the ganged battery cells 102 wound spirally and overlapping on the core 202, for example, as shown in FIG. 13. Ganged cooling plates 120 may also be wound onto the core 202, adjacent the ganged battery cells 102, for purposes of regulating the temperature of the ganged battery cells 102. Each of the ganged battery cells 102 may also be one of flexible and preformed to conform to the shape of the core 202. In alternative embodiments, the core 202 is hollow and configured for a cooling fluid to be circulated therethrough, for regulation of the temperature of the ganged battery cells 102. Other configurations for the battery cell assembly 200, in which the ganged battery cells 102 are wrapped as opposed to stacked, are also within the scope of the disclosure.

The battery cell assembly 100, 100', 100" may be pre-assembled in a strip and subsequently folded accordion-style during the manufacture of the related battery power system, as described hereinabove. The number of battery cells 102, 102', 102" ganged together can be as high as desired for manufacture of the final battery power system having a power level suitable for a particular application. If the employment of the cooling system is also desired, for the purpose of regulating the temperature of the battery power system, the cooling plates 122, 122" may also be pre-assembled in a strip and interlaced with the ganged battery cells 102, 102', 102", for example, as shown in FIG. 5A-5D, or integrated with the ganged battery cells 102, 102', 102", for example, as shown in FIGS. 6A-6D.

Advantageously, the battery cell assembly 100, 100', 100" of the present disclosure minimizes a manufacturing complexity with respect to the resulting battery power system due, at least in part, to less welding and part handling requirements. The battery cell assembly 100, 100', 100" also maximizes volumetric and mass energy density through reduction in the number of parts associated with the battery power system, and provides a fully sealed module to thereby minimize concerns relating to moisture, condensation, and the related corrosion of the battery cells 102, 102', 102" within the battery cell assembly 100, 100', 100".

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery cell assembly, comprising:
a ganged plurality of battery cells electrically connected in series and coupled via a plurality of first hinges, each battery cell coupled to an adjacent battery cell via one of the first hinges, each battery cell including a cathode and an anode, the plurality of battery cells configured to be stacked upon a folding of the battery cell assembly using the plurality of first hinges; and
a ganged plurality of cooling plates coupled via a plurality of second hinges, each cooling plate coupled to an adjacent cooling plate via one of the second hinges, each cooling plate including an inlet and an outlet fluidly coupled to a coolant flow field, the inlet and the outlet of each cooling plate located together on one side of the cooling plate with the second hinge located on another side of the cooling plate, the plurality of cooling plates configured to be stacked upon a folding of the battery cell assembly using the plurality of second hinges;
wherein the ganged plurality of battery cells and the ganged plurality of cooling plates are interlaced and folded together to form a stack of alternating battery cells and cooling plates.

2. The battery cell assembly of claim 1, wherein the plurality of first hinges is oriented substantially orthogonal to the plurality of second hinges.

3. The battery cell assembly of claim 1, wherein each battery cell is a prismatic battery cell.

4. The battery cell assembly of claim 1, wherein the coolant flow field has a plurality of channels for circulation of a cooling fluid therethrough.

5. The battery cell assembly of claim 1, wherein the plurality of ganged battery cells is sealed between a first nonconductive layer and a second nonconductive layer that together form the plurality of first hinges.

6. The battery cell assembly of claim 5, wherein the first nonconductive layer and the second nonconductive layer electrically insulate the ganged plurality of battery cells.

7. The battery cell assembly of claim 1, wherein each battery cell has a first terminal and a second terminal and the first terminal from one battery cell is electrically coupled to the second terminal of an adjacent battery cell.

8. The battery cell assembly of claim 7, wherein one of the first terminal and the second terminal is disposed in the first hinge.

9. The battery cell assembly of claim 7, wherein the first terminal and the second terminal are coupled by one of a weld, a mechanical connector, and an electrically conductive adhesive.

10. The battery cell assembly of claim 7, wherein the first terminal and the second terminal are coupled by a jumper disposed between the first terminal and the second terminal.

11. The battery cell assembly of claim 7, wherein each of the first terminal and the second terminal has a foot that facilitates the coupling of the first terminal with the second terminal.

12. The battery cell assembly of claim 7, wherein the first terminal and the second terminal of each battery cell are located on the same side of the battery cell.

13. The battery cell assembly of claim 7, wherein the first terminal and the second terminal of each battery cell are located on opposites sides of the battery cell.

14. The battery cell assembly of claim 1, wherein the inlet and the outlet of each cooling plate are located on the same side of the cooling plate.

15. The battery cell assembly of claim 1, further comprising a battery management system sensor disposed on at least one of the battery cells, wherein the sensor is configured to detect at least one of a voltage and a temperature of the at least one of the battery cells on which the sensor is disposed.

16. A battery cell assembly, comprising:
a ganged plurality of battery cells electrically connected in series and coupled via a plurality of hinges, each battery cell coupled to an adjacent battery cell via one of the hinges, each battery cell including a cathode and an anode, each battery cell having a first terminal and a second terminal where the first terminal from one battery cell is electrically coupled to the second terminal of an adjacent battery cell and one of the first terminal and the second terminal is disposed in the hinge, the plurality of battery cells configured to be stacked upon a folding of the battery cell assembly using the plurality of hinges;
wherein at least one of the battery cells has a cooling plate integrally formed therewith, the cooling plate configured to be disposed between the one battery cell and an adjacent battery cell upon a folding of the battery cell assembly, the cooling plate including an inlet and an outlet fluidly coupled to a coolant flow field, and the inlet and the outlet of the cooling plate are located on the same side as the hinge.

17. The battery cell assembly of claim 16, wherein each of the battery cells has a cooling plate integrally formed therewith and the ganged plurality of battery cells is folded accordion-style to form a stack.

18. A battery cell assembly, comprising:
a ganged plurality of battery cells electrically connected in series, the plurality of battery cells wound upon a core with multiple battery cells contacting the core; and
a ganged plurality of cooling plates wound upon the core adjacent the ganged plurality of battery cells;
wherein the battery cells are helically wound and progress along a length of the core and the core is hollow and configured for a cooling fluid to be circulated therethrough.

19. The battery cell assembly of claim 18, wherein the battery cells overlap each other.

* * * * *